United States Patent

Case et al.

[15] 3,640,808

[45] Feb. 8, 1972

[54] RADIOLYTIC DESTRUCTION OF NONBIODEGRADABLE ORGANIC PESTICIDES

[72] Inventors: Forrest N. Case, Oak Ridge, Tenn.; Arthur W. Garrison, Watkinsville, Ga.; Donald L. Kau, Rockwood; David E. Smiley, Knoxville, both of Tenn.

[73] Assignee: The United States of America as represented by the United States Atomic Energy Commission

[22] Filed: Oct. 7, 1969

[21] Appl. No.: 864,521

[52] U.S. Cl. .....................................................204/158 HE
[51] Int. Cl. ...........................................................B01j 1/10
[58] Field of Search ............................204/157.1 H, 158 HE

[56] References Cited

UNITED STATES PATENTS 3,537,966  11/1970  Steinberg........................204/157.1 H
3,553,089  1/1971  Mytelka et al..................204/158 HE

*Primary Examiner*—Howard S. Williams
*Attorney*—Roland A. Anderson

[57] ABSTRACT

This invention relates to a method for treating industrial waste solutions containing nonbiodegradable organic pesticides which comprises saturating the solution with oxygen and then irradiating the pressurized solution until the pesticide has been decomposed into nontoxic constituents to that degree required for safe disposal.

1 Claims, No Drawings

RADIOLYTIC DESTRUCTION OF NONBIODEGRADABLE ORGANIC PESTICIDES

BACKGROUND OF THE INVENTION

The invention described herein was made in the course of, or under, a contract with the U.S.A.E.C. It relates generally to the area of pesticide pollution, and more particularly to a method for treating liquid industrial waste streams containing halogenated hydrocarbons having pesticidal activity.

It has become standard practice in many textile and carpet manufacturing facilities to treat textile fibers and cloth with organic pesticides dissolved in organic solvents or dispersed in aqueous media. A principal class of pesticide used for this purpose is selected from the group consisting of halogenated, particularly chlorinated, hydrocarbons which are highly nonbiodegradable, i.e., in the sense that they are highly resistant to being broken down by nature into harmless components. It has by now been fairly well established that, when released to natural environments, they persist for many years, causing harmful effects on the normal ecological balance. Typical halogenated hydrocarbons having pesticidal action which are found and used in liquid effluent streams are, but are not limited to, such pesticides as endrin, dieldrin, aldrin, chlordan, toxaphene, lindane, methoxychlor, heptachlor, 2,4–D, 2,4,5–T, and DDT, as these terms are defined in the 1956 and subsequent editions of the *Condensed Chemical Dictionary*, published by Reinhold Publishing Company.

Recognizing that the toxicity of these pesticide-containing liquid effluents must be reduced as a matter of public health and safety, methods have been devised for treating such wastes based on anaerobic lagooning or fermentation techniques. While studies show that nonbiodegradable hydrocarbons can be reduced by about 90 percent over a period of a month or more, liquid wastes treated by these methods still contain harmful levels of pesticide. Nevertheless, such effluents are released into surrounding natural streams and dilution effects are relied upon to reduce the potential harmful effects. It is therefore clear that industrial waste treatments are only partially effective to reduce pesticide concentration. Such treatments require an inordinate amount of time to produce, at best, a partially effective result.

SUMMARY OF THE INVENTION

It is the principal object of this invention to provide a method for treating pesticide-containing liquid waste streams in an efficient, effective manner to reduce their concentration or to convert them to harmless components in a relatively short time.

This and other objects of the invention are met by saturating liquid wastes of the character defined with oxygen by pressurizing such liquids to a partial pressure of oxygen or air of at least 300 p.s.i. and then subjecting the pressurized liquid to a gamma dosage sufficient to reduce the concentration of pesticide to an acceptable, safe level for disposal to the natural environment. Under these general conditions, the amount of pesticide can be reduced by at least an order of magnitude in some cases within a period of minutes at total gamma dosages ranging from 1 to 2 megaroentgen. The dramatically beneficial effects of this invention are most apparent when the pesticide is in solution or in an extremely finely dispersed phase. It is not effective where the pesticide is not dispersed or where high-pressure radiolysis will result in precipitation. It is most effective where the pesticide concentration is in the parts-per-million range and thus at a concentration where prior art methods are least effective.

The following representative examples will illustrate the effectiveness of the invention in reducing the pesticide known as dieldrin, a nonbiodegradable aqueous-insoluble pesticide.

Example I

A feed solution containing 20 parts per million (p.p.m.) dieldrin emulsified in $H_2O$ was charged into a glass-lined stainless steel pressure vessel pressurized with an oxygen-containing atmosphere using either pure oxygen or air and the resultant pressurized system was irradiated at a dose rate of $8 \times 10^6$ roentgen/hour (r./hr.) with a cobalt-60 source, the reaction vessel being maintained at a temperature of 30° C. by an encompassing water jacket. The feed solution was subjected to a variety of conditions of pressure and radiation in order to define the critical operating parameters. After each treatment the resultant solution was analyzed chromatographically using an electron capture detector to determine the amount of dieldrin. The results are shown in Table I below.

TABLE I

| Experiment No. | Irradiation time, hrs. | Conditions | Dieldrin, p.p.m. (by weight) | Percent pesticide removed |
|---|---|---|---|---|
| 1 | 1 | Atm. press. | 7.1 | 64.5 |
| 2 | 1 | 1,800 p.s.i. $O_2$ | 0.2 | 99.0 |
| 3 | 1 | 1,880 p.s.i. air | 0.3 | 98.5 |
| 4 | 0 | 1,800 p.s.i. $O_2$ | 13.5 | 32.5 |
| 5 | 0 | 1,800 p.s.i. air | 14.0 | 30.0 |

It can be seen that the analyses for dieldrin before and after irradiation to a total dosage of $8 \times 10^6$ r. with and without pressurized oxygen or air showed dramatically how the pesticide could be rapidly and substantially eliminated from the test solutions. The use of pressure alone or radiation alone is only partially effective and highlights the extreme advantage of combining a pressurized oxygen-containing atmosphere with radiation to achieve a rapid radiolytic destruction of the pesticide. Destruction of the pesticide is monitored by chromatographic techniques and can also be followed by measuring the pH of the pressurized solution. As the chlorinated hydrocarbon is destroyed, it apparently releases chloride ion, which combines with any water present to acidify the irradiated liquid.

Example II

An aqueous feed solution containing 5 p.p.m. dieldrin was irradiated under an oxygen pressure of 1,800 p.s.i. with a cobalt-60 source at a dose rate of $8 \times 10^6$ r./hr. for periods of from 15 to 30 minutes. The results are summarized in Table II below.

TABLE II

| Run No. | Time, min. | Dieldrin after Treatment p.p.m. | Weight % |
|---|---|---|---|
| 1 | 15 | 0.12 | 98 |
| 2 | 15 | 0.09 | 98 |
| 3 | 30 | 0.10 | 98 |
| 4 | 30 | 0.04 | 99 |

What is claimed is:

1. A method for treating industrial waste solutions containing nonbiodegradable organic pesticides which comprises pressurizing said solution with an oxygen pressure of from 300 to 1,800 p.s.i. and then irradiating the pressurized solution to a point where the solution has been acidified and at least 95 percent of the pesticide has been destroyed.

* * * * *